Dec. 2, 1924.
R. E. MALECKE
1,517,998
SAFETY DEVICE FOR AUTOMOBILES
Filed March 25, 1924
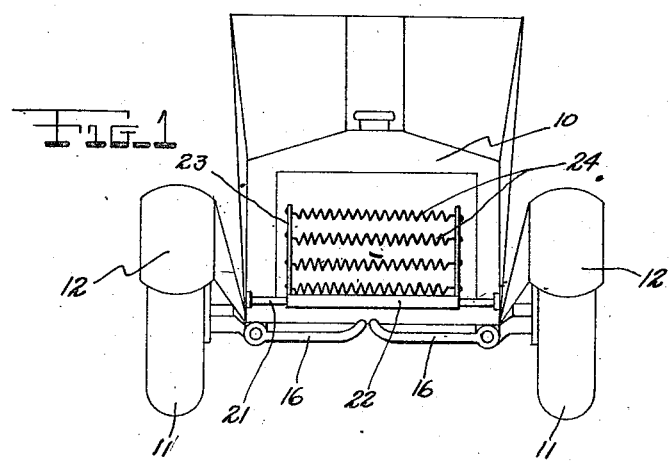
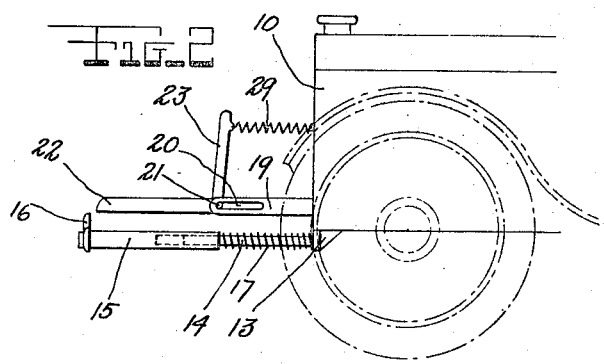
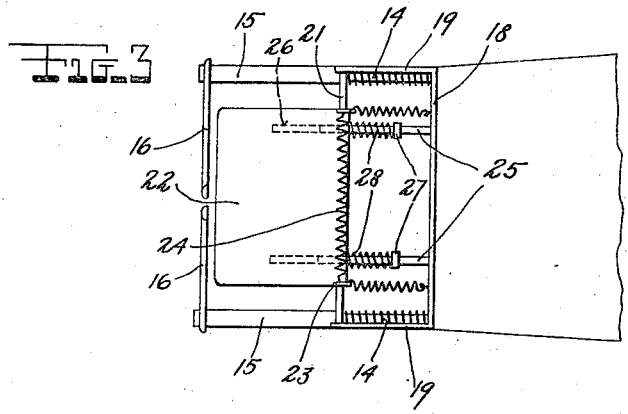
INVENTOR
R.E. Malecke
BY
ATTORNEY Patented Dec. 2, 1924.

1,517,998

UNITED STATES PATENT OFFICE.

ROBERT E. MALECKE, OF NEW YORK, N. Y.

SAFETY DEVICE FOR AUTOMOBILES.

Application filed March 25, 1924. Serial No. 701,672.

*To all whom it may concern:*

Be it known that I, ROBERT E. MALECKE, a citizen of the United States, residing at New York, in the county of New York and State of New York, have invented certain new and useful Improvements in Safety Devices for Automobiles, of which the following is a specification.

The main object of this invention is to provide a fender which is attached to the forward end of a vehicle and an additional safety seat behind the fender useful for catching a person struck and seating him in a position where no injury would result from further forward travel of the vehicle.

Another object is to provide a yieldable fender and a yieldable safety seat designed to take up the impact pressure and prevent injury to a person who has been struck by the vehicle.

These and other objects will become apparent in the description below, in which characters of reference refer to like-named parts in the drawing.

Referring briefly to the drawing, Figure 1 is a front elevational view of a vehicle, showing the fender and seat mounted in place thereon.

Figure 2 is a side elevational view of the device as mounted on the vehicle.

Figure 3 is a top plan view of Figure 2.

Referring in detail to the drawing, the numeral 10 indicates the forward portion of the body of the vehicle which is supported on wheels 11, the wheels being provided with mud guards 12. At the corners of the body of the vehicle, brackets 13 are mounted on the underside, and from these brackets, horizontal studs 14 extend forwardly. The ends of the studs slidably receive the bars 15 which are hollow thruout a greater portion of their length and to which are secured the fender braces 16, the latter extending from the bars 15 toward each other. In order to retain the bars 15 in extended position, coil springs 17 are wound about the studs 14 toward the brackets 13 and the faces of the bars 15. By engaging the members mentioned, the coil springs normally retain the bars 15 in yieldable extended position. An additional U-shaped bracket 18 spans horizontally across the body of the vehicle above the brackets 13 and the arms 19 of the last-named bracket are provided with horizontal slots 20 which form guides for the pins 21, the latter supporting and extending from the rear corners of a seat 22. At the rear corners of the seat 22, straps 23 rise vertically therefrom, said straps forming anchoring elements for the ends of springs 24. In order to prevent the seat from rotating about the axis of the pins 21, a pair of rods 25 are provided and extend forwardly from member 18 and are slidable in channels 26, the latter passing horizontally from the rear edge into the body of the seat 22. These rods are provided with collars 27 which form shoulders on which coil springs 28 are seated, the coil springs being wound upon the rods 25 between the collars 27 and the rear edge of the seat 22. At the upper corners and rear edges of the straps 22, additional springs 29 are anchored, these springs coursing rearwardly and have their opposite ends anchored to the body of the vehicle.

The device herein described when in operation is designed to prevent injury to a person when struck by the vehicle. The person usually struck is in standing position with his back turned toward the vehicle, and as the fenders which are the farthest advanced, usually strike the person in the region of the knees, said fenders will bend the knees after which the person will assume a sitting position. The seat 22 then receives the person who has been involuntarily forced into this sitting position, and the additional impact due to the forward progress of the vehicle will force the seat rearwardly, and the springs 28 and 17 take up this impact and prevent injury to the person.

I claim:—

1. A combination of a fender and a safety seat comprising studs secured to the body of the vehicle, hollow bars slidable on the ends of said studs, fenders secured to the forward ends of said bars, means for normally retaining the bars in extended position, and a movably normally extended seat for supporting a person in front of the vehicle.

2. A combination of a fender and a safety seat comprising studs secured to the body of the vehicle, hollow bars slidable on the ends of said studs, fenders secured to the forward ends of said bars, springs wound on said studs and adapted to yieldably extend the fenders, a seat mounted above the fenders, and yieldable means cooperating with the seat for normally extending the same, after a moment of impact.

3. A combination of a fender and a safety seat comprising studs secured to the body of the vehicle, hollow bars slidable on the ends of said studs, fenders secured to the forward ends of said bars, springs wound on said studs and adapted to yieldably extend the fenders, a seat mounted about the fenders, studs extending from the rear corners of the seat, a U-shaped bracket rigid with the vehicle, arms on said bracket having slits therein, rods extending from said U-shaped bracket, the forward ends of said rods being engaged in channels in the seat, and means on said rods for yieldably extending the seat member.

4. A combination of a fender and a safety seat comprising studs secured to the body of the vehicle, hollow bars slidable on the ends of said studs, fenders secured to the forward ends of said bars, springs wound on said studs and adapted to yieldably extend the fenders, a seat mounted about the fenders, studs extending from the rear corners of the seat, a U-shaped bracket rigid with the vehicle, arms on said bracket having slits therein, rods extending from said U-shaped bracket, the forward ends of said rods being engaged in channels in the seat, springs mounted on said rods normally moving the seat forwardly, vertical straps rising from the corners of said seat, and springs spanning the distance between said straps and forming a back rest for the seat.

In testimony whereof I affix my signature.

ROBERT E. MALECKE.